US012812756B2

(12) United States Patent
Kellogg et al.

(10) Patent No.: US 12,812,756 B2
(45) Date of Patent: Nov. 24, 2026

(54) SYSTEM AND METHOD FOR SPECTROMETRY OF A SAMPLE IN A PLASMA

(71) Applicants: FEI Company, Hillsboro, OR (US); Thermo Fisher Scientific (Bremen) GmbH, Bremen (DE); Thermo Fisher Scientific SARL, Cheseaux-sur-lausanne (CH)

(72) Inventors: Sean Kellogg, Hillsboro, OR (US); Hans-Juergen Schlueter, Bremen (DE); Patrick Lancuba, Mission Viejo, CA (US)

(73) Assignees: FEI Company, Hillsboro, OR (US); Thermo Fisher Scientific (Bremen) GmbH, Bremen (DE); Thermo Fisher Scientific SARL, Cheseaux-sur-Lausanne (CH)

( * ) Notice: Subject to any disclaimer, the term of this patent is extended or adjusted under 35 U.S.C. 154(b) by 36 days.

(21) Appl. No.: 18/723,281

(22) PCT Filed: Dec. 21, 2021

(86) PCT No.: PCT/US2021/064520
§ 371 (c)(1),
(2) Date: Jun. 21, 2024

(87) PCT Pub. No.: WO2023/121653
PCT Pub. Date: Jun. 29, 2023

(65) Prior Publication Data
US 2025/0159789 A1 May 15, 2025

(51) Int. Cl.
*H05H 1/00* (2006.01)
*G01N 21/67* (2006.01)
(Continued)

(52) U.S. Cl.
CPC ........... *H05H 1/0037* (2013.01); *G01N 21/67* (2013.01); *H01J 49/0013* (2013.01); *H01J 49/105* (2013.01)

(58) Field of Classification Search
None
See application file for complete search history.

(56) References Cited

U.S. PATENT DOCUMENTS 7,728,253 B2 * 6/2010 Hopwood ......... H01J 37/32366 219/121.41
8,029,105 B2 10/2011 Sieber et al.
(Continued)

OTHER PUBLICATIONS

Hoskinson et al., "Low-power microwave-generated helium microplasma for molecular and atomic spectrometry," *Journal of Analytical Atomic Spectrometry*, 26(6): 1258-1264 (Feb. 2011).
(Continued)

*Primary Examiner* — Kenneth B Wells
(74) *Attorney, Agent, or Firm* — Klarquist Sparkman, LLP

(57) ABSTRACT

A system and method for spectrometry of a sample in a plasma is described. The system includes a split ring resonator, an electrode, and a delivery system. The split ring resonator has a discharge gap, and the electrode is arranged in proximity to, but spaced apart from, the discharge gap such that. When a sufficient power is supplied to a plasma generated in the discharge gap, the plasma extends towards and couples with the electrode, so that the plasma is established in a region between the discharge gap and the electrode. The delivery system is for introduction of a sample into the plasma established in the region between the discharge gap and the electrode. The system is configured to direct an output from the plasma to a spectrometer for analysis.

17 Claims, 8 Drawing Sheets

(51) Int. Cl.
*H01J 49/00* (2006.01)
*H01J 49/10* (2006.01)

(56) References Cited

U.S. PATENT DOCUMENTS

| | | | |
|---|---|---|---|
| 8,736,174 B2 | 5/2014 | Urdahl et al. | |
| 9,054,491 B1 * | 6/2015 | Hurlbut | H01S 5/1071 |
| 9,784,712 B2 | 10/2017 | Persson et al. | |
| 2007/0170995 A1 | 7/2007 | Dutton et al. | |
| 2009/0102886 A1 * | 4/2009 | Sieber | B41J 2/1637 347/45 |
| 2016/0254133 A1 | 9/2016 | Lopez-Avila et al. | |

OTHER PUBLICATIONS

International Search Report and Written Opinion for related International Application No. PCT/US2021/064520, dated Sep. 28, 2022, 21 pages.

Miura et al., "Instability control in microwave-frequency microplasma," *The European Physical Journal D*, 66(143):1-10 (May 2012).

* cited by examiner

8A

8B

SYSTEM AND METHOD FOR SPECTROMETRY OF A SAMPLE IN A PLASMA

FIELD OF THE INVENTION

The invention relates to a system for spectrometry of a sample in a plasma. The system makes use of a split ring resonator to form a plasma, into which a sample can be introduced. An output from the plasma is directed to a spectrometer for mass spectrometry (MS) or for optical emission spectrometry (OES). Also described is a method for spectrometry of a sample in a plasma, and a plasma source.

BACKGROUND

Rapid and accurate identification of chemical species within a sample is required in many situations. For instance, quick screening of water samples can allow the identification of contamination by specific analytes, which might otherwise be deleterious to health. Chemical analysis of soil samples may provide information helpful for the management and cultivation of crops. Information on the chemical components of a rock sample may be helpful when mining for minerals. Many applications would benefit from fast yet precise evaluation of specimens in the field, without having to wait for test results on samples sent to a laboratory.

Spectrometry of a sample in a plasma (or plasma spectrometry) relates to a family of analytical techniques used for the detection of chemical elements. It describes forms of spectrometry that uses a plasma to ionize and/or produce excited atoms and ions of a sample. In one example, the plasma is generated by inductively coupling electrical power to the plasma, although other types of plasmas (including glow discharge, microwave plasma, capacitively coupled radio frequency (RF) plasma, laser-generated plasma etc.) could be used. In plasma optical emission spectrometry (OES), sample ions or atoms excited in a plasma emit electromagnetic radiation at wavelengths characteristic of a particular element. By detecting the emitted electromagnetic radiation (for instance, in the visible or UV region of the light spectrum), species within a sample can be identified. Alternatively, in plasma mass spectrometry (ICP-MS) sample atomic or molecular ions generated in a plasma are passed to a mass analyser, where the ions are separated on the basis of their mass-to-charge ratio. The ions are then directed onwards to a detector, arranged to sense an ion signal proportional to the concentration of ions having a given mass-to-charge ratio.

Plasmas required for analytical applications such as spectrometry must sustain a high excitation temperature and be relatively stable. Plasmas having these types of characteristics are most readily formed in a laboratory, and instruments for spectrometry of a sample in a plasma tend to be situated in a laboratory or specialised testing facility. Thus, samples for testing will most often be collected and transported to a laboratory for analysis. This can cause a delay in obtaining results.

Miniaturised plasma sources are used in a variety of applications, including for sterilisation or as ion sources. One type of miniaturised plasma source is a split ring resonator 10, having a dielectric substrate 12 sandwiched between a metal microstrip line 11 and a ground plane 14, as illustrated in FIG. 1A. As shown in FIG. 1B, the microstrip line 11 comprises a stem 16 and arms (which could alternatively be referred to as legs) 18, 20, the arms arranged to form a loop or ring having a small discharge gap 22 between the distal ends of the arms. The arms 18, 20 provide a dipole, corresponding to a half-wavelength microwave resonator. The stem 16 is a feed line, which can be used to supply high frequency power from a transmission line to the dipole.

At resonance, an electric potential at the distal ends of the arms 18, 20 of the split ring resonator 10 is out of phase by 180°. This generates a standing wave created in the dipole, wherein the potential is at a maximum or minimum at the distal ends of the arms 18, 20 of the microstrip line, although 180° out of phase. This enables the amplitude of an electric field across the discharge gap 22 to be extremely high. As a result, with a relatively low input power, a large potential difference is created across the discharge gap 22, which can be used to ignite and sustain a plasma in the gap.

In order to effectively operate the split-ring resonator 10, the input impedance of the ring 18, 20 should match the impedance of the transmission line at the stem 16. The characteristic impedance of the ring 18, 20 depends on the width of the microstrip and the thickness and relative permittivity of the dielectric. The impedance of the ring tends to change substantially when the plasma is present, making it difficult to efficiently couple all of the power from the transmission line into the plasma.

Particular examples of miniaturised plasma sources based on a microstrip split ring resonator are discussed in U.S. Pat. Nos. 9,784,712 and 8,736,174. U.S. Pat. No. 9,784,712 describes a split-ring resonator that is arranged between a first and a second dielectric layer, and a first and a second electrically conductive ground plate. An aperture is formed in the first and second dielectric layer and the first and a second electrically conductive ground plate in the region of the discharge gap of the split ring resonator, such that a plasma can be generated in the gap. The described split ring resonator can be used for optogalvanic spectroscopy, in which an analyte is located in the plasma in the discharge gap and wherein laser radiation is arranged through the analyte located in the plasma. U.S. Pat. No. 8,736,174 describes a split ring resonator having a pair of electrode extensions connected to the stripline resonant ring at the discharge gap, and an enclosure that substantially encloses at least a region including the discharge gap and the electrode extensions. A gas flow is arranged through the enclosure. The enclosure is arranged to contain a plasma at the split ring resonator.

Microplasmas formed in split ring resonators are inherently very stable and efficient, but have been found to demonstrate lower ion temperatures than some plasmas formed using more longstanding methods (such as plasmas being driven by direct current (DC) or pulsed DC power supplies). Miura and Hopwood (*Eur. Phys. J. D* (2012) 66:143) showed that the ion temperatures of a plasma initially ignited in the discharge gap of a split-ring resonator could be significantly increased by providing an electrical path to ground in close proximity to the discharge gap. By providing such an electrical path (here, in the form of a ground pin close to the discharge gap) seed electrons generated from a plasma at the discharge gap could ignite a new discharge between the arms of the split-ring resonator and the ground pin. This new discharge (denoted "high density mode") was found to support a higher power, more intense plasma, with higher electron densities and higher temperatures.

In view of the above an improved system and method for spectrometry of a sample in a plasma is sought.

SUMMARY

In a first aspect, there is a system for spectrometry of a sample in a plasma, comprising: a split ring resonator, having a discharge gap; an electrode arranged in proximity to, but spaced apart from, the discharge gap such that, when a sufficient power is supplied to a plasma generated in the discharge gap, the plasma extends towards and couples with the electrode, so that the plasma is established in a region between the discharge gap and the electrode; and a delivery system, for introduction of a sample into the plasma established in the region between the discharge gap and the electrode; wherein the system is configured to direct an output from the plasma to a spectrometer for analysis.

In a second aspect there is a method for spectrometry of a sample in a plasma, comprising generating a plasma in the discharge gap of a split ring resonator; increasing the power supplied to the plasma to cause the plasma to extend towards and couple with an electrode arranged in proximity to, but spaced apart from, the discharge gap, so that the plasma is established in a region between the discharge gap and the electrode; introducing a sample into the plasma established in the region between the discharge gap and the electrode; and directing an output from the plasma to a spectrometer for analysis.

In a third aspect there is a plasma source, comprising:

a split ring resonator, having a discharge gap and formed as a microstrip or stripline;

wherein the split ring resonator comprises a hollow channel arranged through a metallic strip of the microstrip or stripline, the hollow channel configured to supply a gas to the discharge gap; and wherein, in use, the split ring resonator is configured to generate a plasma at the discharge gap. The plasma source may be the split ring resonator used within the system or method for spectrometry of a sample in a plasma, described above.

BRIEF DESCRIPTION OF THE FIGURES

The disclosure can be put into practice in a number of ways, and embodiments will now be described by way of example only and with reference to the accompanying drawings, in which:

FIGS. 1A and 1B illustrate a prior art microstrip split ring resonator plasma source, wherein FIG. 1A is a cross-sectional view through the prior art microstrip split ring resonator plasma source, and FIG. 1B is an overhead view of the prior art microstrip split ring resonator plasma source;

FIGS. 2A and 2B illustrate a system for spectrometry of a sample in a plasma, wherein FIG. 2A is an overhead view of the system, and FIG. 2B is a cross-sectional view through the system;

FIGS. 5A and 5B illustrate a cross-sectional view of example configurations for the electrode, wherein FIG. 5A illustrates a configuration of the electrode for use with a fluid (liquid or gas) or aerosol sample, and FIG. 5B illustrates a configuration of the electrode for use with a solid sample;

FIGS. 6A and 6B illustrate a system for spectrometry of a sample in a plasma, the system comprising a hollow split-ring resonator plasma source, wherein FIG. 6A is an overhead view of the system, and FIG. 6B is a cross-sectional view through the system.

FIGS. 8A and 8B illustrate cross-sectional views of the system for spectrometry of a sample in a plasma, the spit-ring resonator formed as a stripline configuration, wherein FIG. 8A is a cross-section along the line of axis 'A' of FIG. 7, and FIG. 8B is a cross-section along the line of axis 'B' of FIG. 7.

In the figures, like parts are denoted by like reference numerals. The figures are not drawn to scale.

DETAILED DESCRIPTION

Figures 1A, 1B:
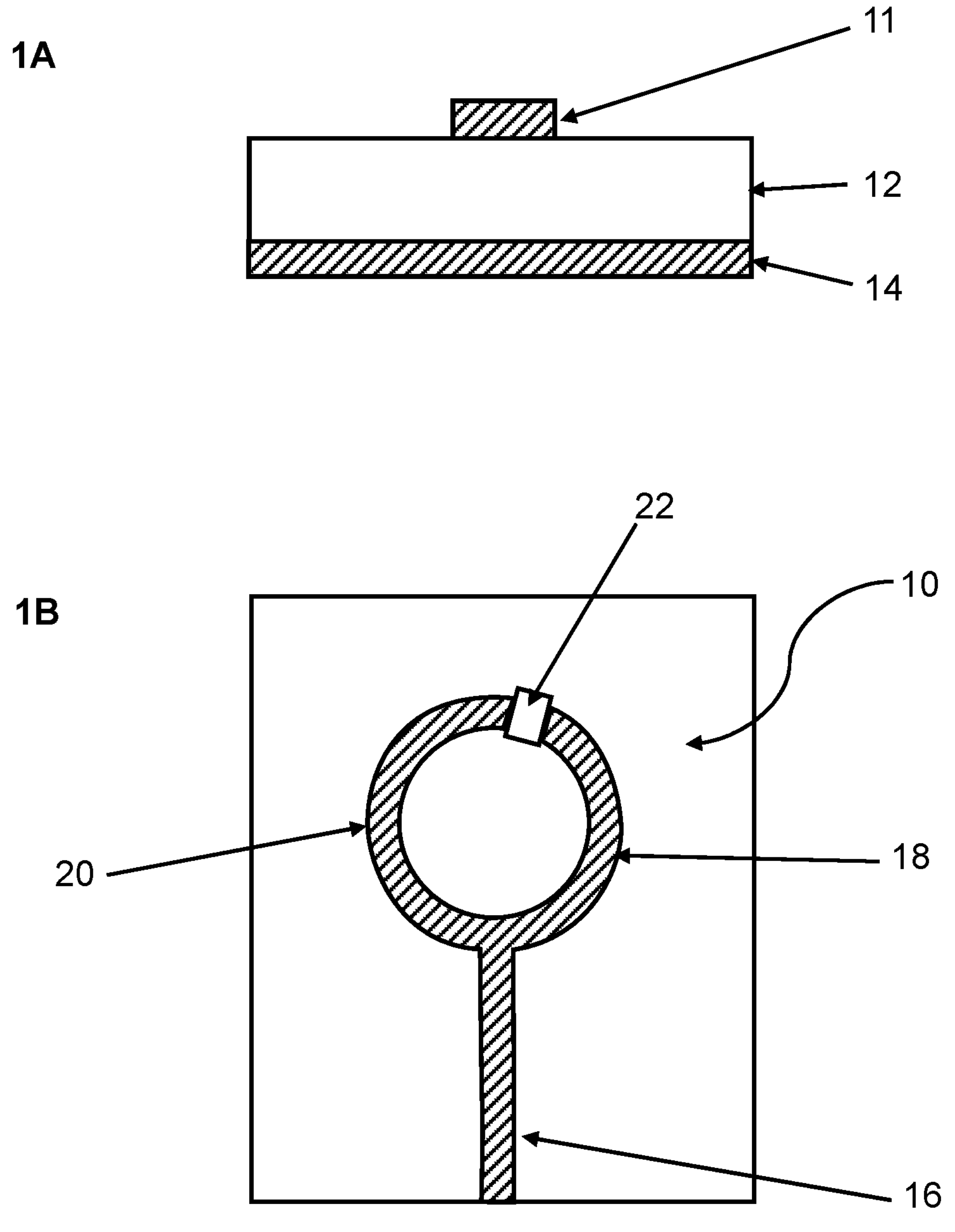
FIGURE 1A-1B (Prior art)
Figures 2A, 2B:
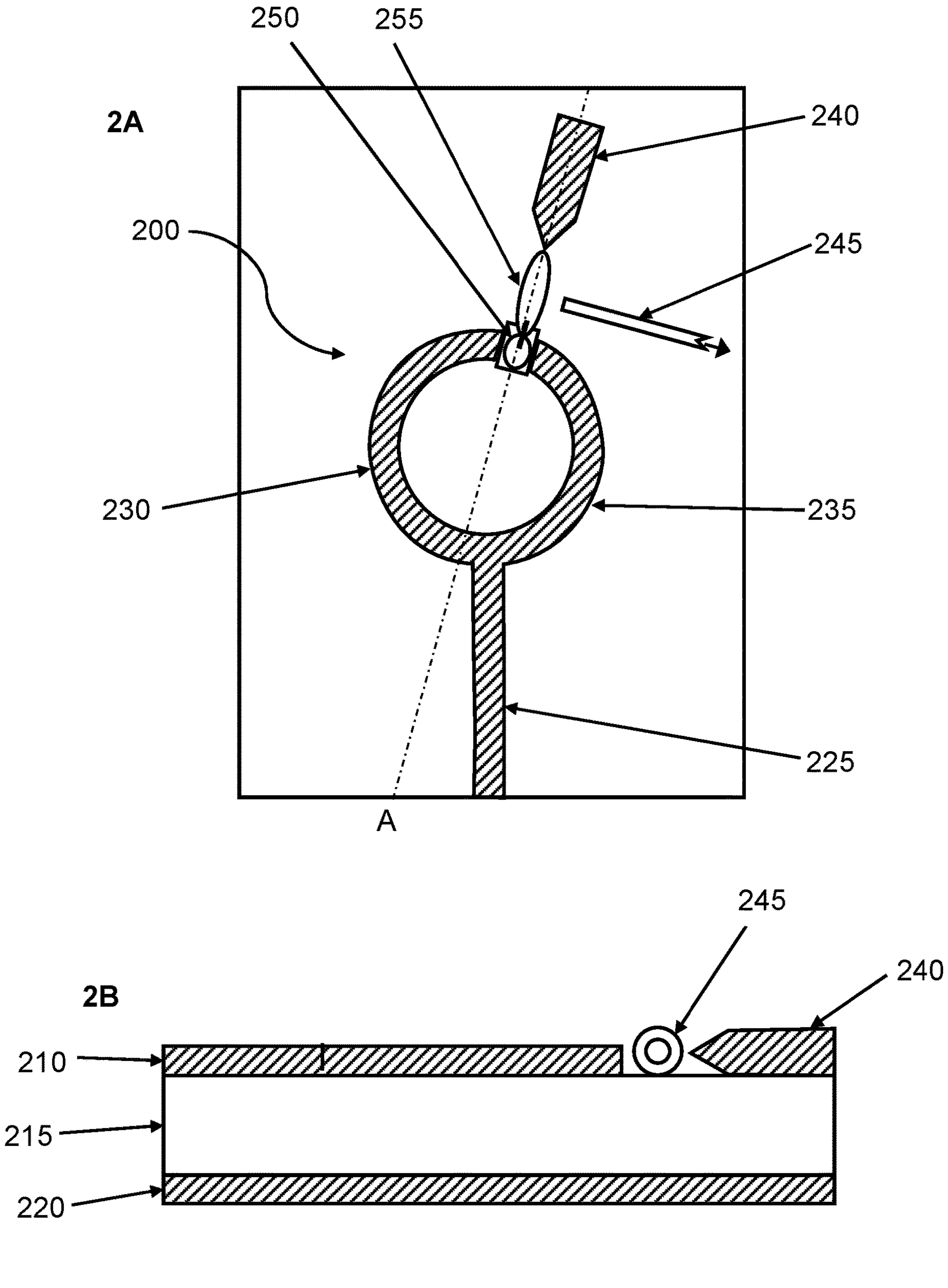

A system for plasma spectrometry of a sample is shown in FIGS. 2A and 2B. FIG. 2A is an overhead view of the system, and FIG. 2B is a cross-sectional view through the system, wherein the cross-section is shown on the axis 'A' marked as a dotted line in FIG. 2A.

The system comprises a split-ring resonator 200 arranged as a microstrip line 210 on a dielectric substrate, where the microstrip line of the ring typically has a characteristic impedance in the range of 20 to 20,000 Ohm. In particular, the split-ring resonator 200 comprises a stem 225, and arms 230, 235 folded to form a ring with a gap (the "discharge gap") between the distal ends of the arms. The arms are of different lengths, providing a dipole that, when radio frequency (RF) or microwave frequency power is applied via the stem 225, causes the potential at the distal ends of the arms 230, 235 to be 180° out of phase. A metallic layer 220 is applied on the back face of the dielectric substrate 215. That is, the metallic layer 220 is applied on the surface of the dielectric substrate 215 opposite the face on which the split ring-resonator 200 is arranged. The metallic layer 220 acts as a reference plane and may be grounded. In operation, application of high frequency power causes ignition of a plasma in the discharge gap.

The system further comprises an electrode 240. The electrode 240 is positioned in proximity to, although spaced apart from, the discharge gap. In operation, an electrical potential may occur between the split-ring resonator 200 and the electrode 240. Typically, the electrode 240 is grounded.

Optics or optical elements 245 are arranged in close proximity to the region between the discharge gap and the end of the electrode 240 closest to the discharge gap. The optics 245 may be an optical fibre or other optical elements for directing, focusing or splitting light, or the optics 245 may be ion optics for receiving and directing ions (see discussion of FIG. 3 and FIG. 4, below).

In the present example, the described arrangement is formed as 100 μm thick, 1 mm wide metallic microstrip 210 on a dielectric substrate 215 that is around 1.2 mm thick. The split-ring resonator 200 is formed having a ring circumference that is one half the wavelength of the excitation frequency to be used to ignite the plasma in the discharge gap. For instance, in a specific example, the excitation frequency is 1 GHz and so the circumference of the ring of the split ring resonator 200 is approximately 6.3 cm (having 20 mm diameter) with a discharge gap of around 0.1 mm. The electrode 240 is formed as a 1 mm diameter gold wire, having a sharpened tip. The tip is located around 3 mm from the centre point of the discharge gap. Although the split ring resonator 200 and electrode 240 may be arranged in a chamber to allow evacuation and then provision of a specific carrier gas (such as argon), the carrier gas is ideally supplied at atmospheric pressure. In some cases, air may be used as a carrier gas, in which case use of a gas-tight chamber surrounding the split ring resonator 200 and electrode 240 may not be necessary.

In use, an excitation frequency is applied to the stem 225 and ring (including arms 230, 235) of the split-ring resonator, creating a dipole. This ignites a plasma 250 in a carrier gas (for example, argon) at the discharge gap. As power is increased to the plasma, the impedance across the discharge gap decreases. Seed electrons at the plasma will be drawn to the electrode 240, causing the plasma to change to (or ignite in) a high-density mode that supports a higher density of ions and a more intense plasma (with a higher excitation temperature). The high density mode plasma 255 extends between, and can be sustained between, the distal arms 230, 235 of the split-ring resonator 200 and the electrode 240, and is coupled to the electrode 240, optimally where the impedance of the plasma is matched to the impedance of the power source. The power applied to the split ring resonator to be sufficient to cause the high-density mode plasma may be greater than 5 Watt, greater than 8 Watt, or even greater than 10 Watt. The power supplied to the split ring resonator to achieve the high-density mode plasma will typically be between 8 and 40 Watt.

A sample for analysis can be provided to the plasma 255 in the high-density mode by a delivery system, causing ionization and/or excitation of atoms and molecules within the sample. Output from the high-density plasma 255 may include electromagnetic radiation, as a result of relaxation of excited atoms or molecules, or may be ions. The output can be received at the optics or optical elements 245, and via the optics 245 be directed to a spectrometer (not shown) for analysis and detection.

Although specific dimensions or characteristics are described above with respect to the split ring resonator device 200, it will be understood that a number of aspects may be varied. For instance, the excitation frequency will typically be in the radio or microwave range. The excitation frequency may be 0.2 GHz to 50 GHZ, or 0.3 GHZ to 5 GHz. The circumference of the ring of the split ring resonator 200 depends on the wavelength of the excitation frequency, requiring the ends of the distal arms 230, 235 of the ring to provide a dipole that is 180° out of phase. The wavelength of the excitation frequency may itself scale with the inverse of the square root of the dielectric constant (relative permittivity) of the dielectric substrate. Thus, increasing the dielectric constant of the substrate allows reduction of the size of the ring of the split ring resonator. For most excitation frequencies, the ring will have a circumference that is half the wavelength of the excitation frequency. In some implementations, the ring will have a circumference of between 0.3 and 15 cm. In some other implementations the ring will have a circumference of between 2 and 10 cm. The discharge gap (measured as the spacing between the distal end of the first arm and the distal end of the second arm of the split ring resonator) may be between 0.01 and 1 mm. In some implementations, the electrode may be spaced apart from the discharge gap by 0.2 to 20 mm. In some implementations, the electrode is spaced apart from the discharge gap by 0.5 to 10 mm. In some implementations, the distance to the electrode may be between 5 and 1000 times the discharge gap, and in some implementations the distance to the electrode is between 10 and 100 times the discharge gap. Although the electrode is described as formed of gold, other metals could be used. In some implementations, copper could be used or beneficially chemical inert metals such as stainless steel or platinum could be used. The dielectric substrate upon which the split ring resonator is formed may be 0.3 to 2 mm thick. Although argon is described as being used as the carrier gas in which the plasma is formed, other gases (including nitrogen, helium or air) could be used depending on the sample to be analysed.

The inventors have recognised that the high density mode plasma 255, formed using this configuration of a split ring resonator device 200 described with reference to FIGS. 2A-2B, is particularly advantageous for spectrometry of a sample in a plasma (or plasma spectrometry), in view of the high temperatures of the electrons or ions generated within this type of high density mode plasma 255, despite a relatively low input power. Therefore, this configuration for the split ring resonator 200 opens an avenue for smaller, more compact systems for plasma spectrometry, with power requirements more likely to be realisable outside of a laboratory and in the field. Such a compact, hand held instrument for plasma spectrometry could have many and widespread applications, including, for example, for use in geographically remote locations for instant screening of water or soil samples for contaminants or pollution, or for quickly and conveniently analysing other samples at the location they are collected. In contrast to other analytical techniques that may be available using compact instruments (for instance, instruments for X-ray fluorescence), the proposed system for plasma spectrometry can be used for elemental or chemical analysis of nearly all metals and half-metals (including light and heavy elements). As such, the proposed solution is a powerful and adaptable tool.

Figure 3:
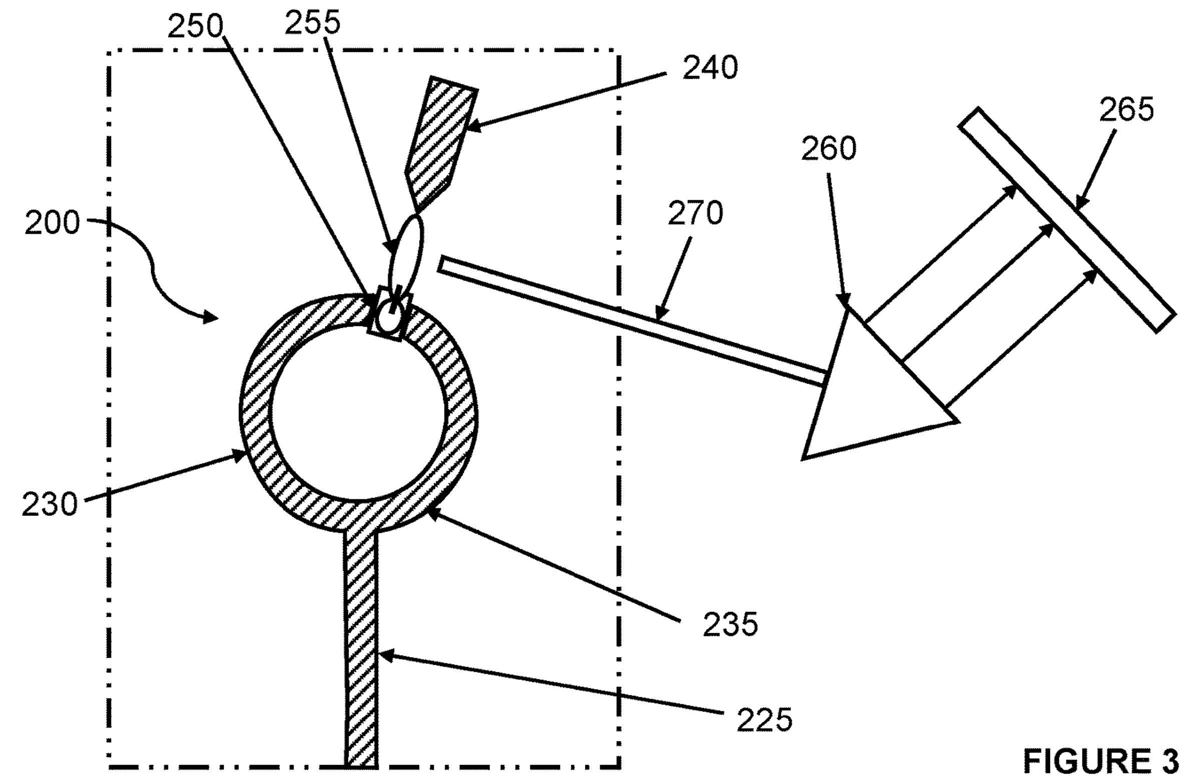
FIG. 3 illustrates a system for optical emission spectrometry of a sample in a plasma.

FIG. 3 illustrates the apparatus of FIGS. 2A-2B in a system for plasma optical emission spectroscopy. Here, the optics 245 shown in FIGS. 2A-2B are an optical fibre or optical elements (such as a system of mirrors and/or lenses) being optics 270 for receiving and directing electromagnetic radiation (photons) from the plasma 255. The electromagnetic radiation may be directed to other optical elements 260 for focusing and dispersing the electromagnetic radiation according to its wavelength. The electromagnetic radiation may then be passed to a detector 265. In an example, the optical element 260 may be a monochromator or polychromator (each comprising a selection of gratings, prisms and/or multiple focusing mirrors). The detector 265 may be a solid-state sensor such as a charge-coupled device (CCD) or charge-injection device (CID), or may be a photomultiplier. Together, the optical element 260 and detector 265 may be components of a spectrometer.

Figure 4:
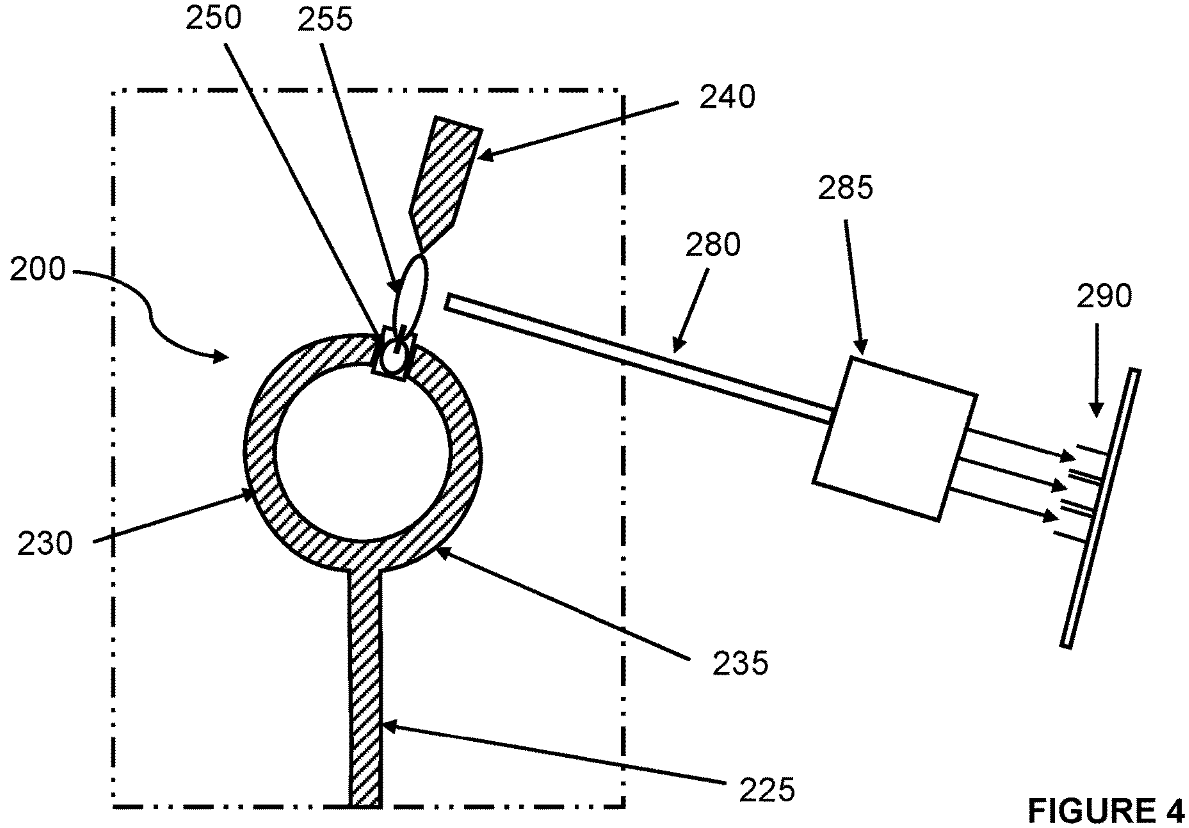
FIG. 4 illustrates a system for mass spectrometry of a sample in a plasma.

FIG. 4 illustrates an alternative system, in which the apparatus of FIGS. 2A-2B are used for mass spectroscopy of a sample introduced to a plasma. In this case, the optics 245 shown in FIGS. 2A-2B comprise ion optics 280 for receiving and directing ions output from the plasma 255. The ions are directed to a mass analyser 285 for separation of ion species according to their mass-to-charge ratio. The separated ion species are subsequently directed to a detector 290 for measurement. In an example, the mass analyser 285 may be a quadrupole mass analyser, a time of flight mass analyser, a magnetic sector mass analyser, an electrostatic mass analyser, a quadrupole ion trap mass analyser or an ion cyclotron resonance mass analyser. Suitable detectors 290 include Faraday cup detectors, electron multipliers, photomultiplier conversion dynodes, or position sensitive array detectors.

The sample may be introduced to the plasma by a delivery system, once the plasma has been established in the region between the discharge gap and the electrode (and so in the high-density mode). In a first example, the delivery system may comprise a conduit, and may be a pipette or other method or apparatus for inserting or introducing a sample into the plasma in a controlled way. The delivery system may allow for introduction of a precise amount or volume of a sample into the plasma. In other alternative examples, the delivery system comprises the electrode, as discussed below with reference to FIGS. 5A to 8B. The delivery system may comprise other components, including a sample holder or sample reservoir, tubes or lines to carry the sample from the sample holder or reservoir to the conduit or electrode, and in some cases a pump. In some implementations, the delivery system further comprises apparatus to change the material phase of a sample (for instance from solid to liquid), or to prepare a sample in a liquid suspension or aerosol. Other elements of a delivery system can be envisaged by the person skilled it in the art.

Figures 5A, 5B:
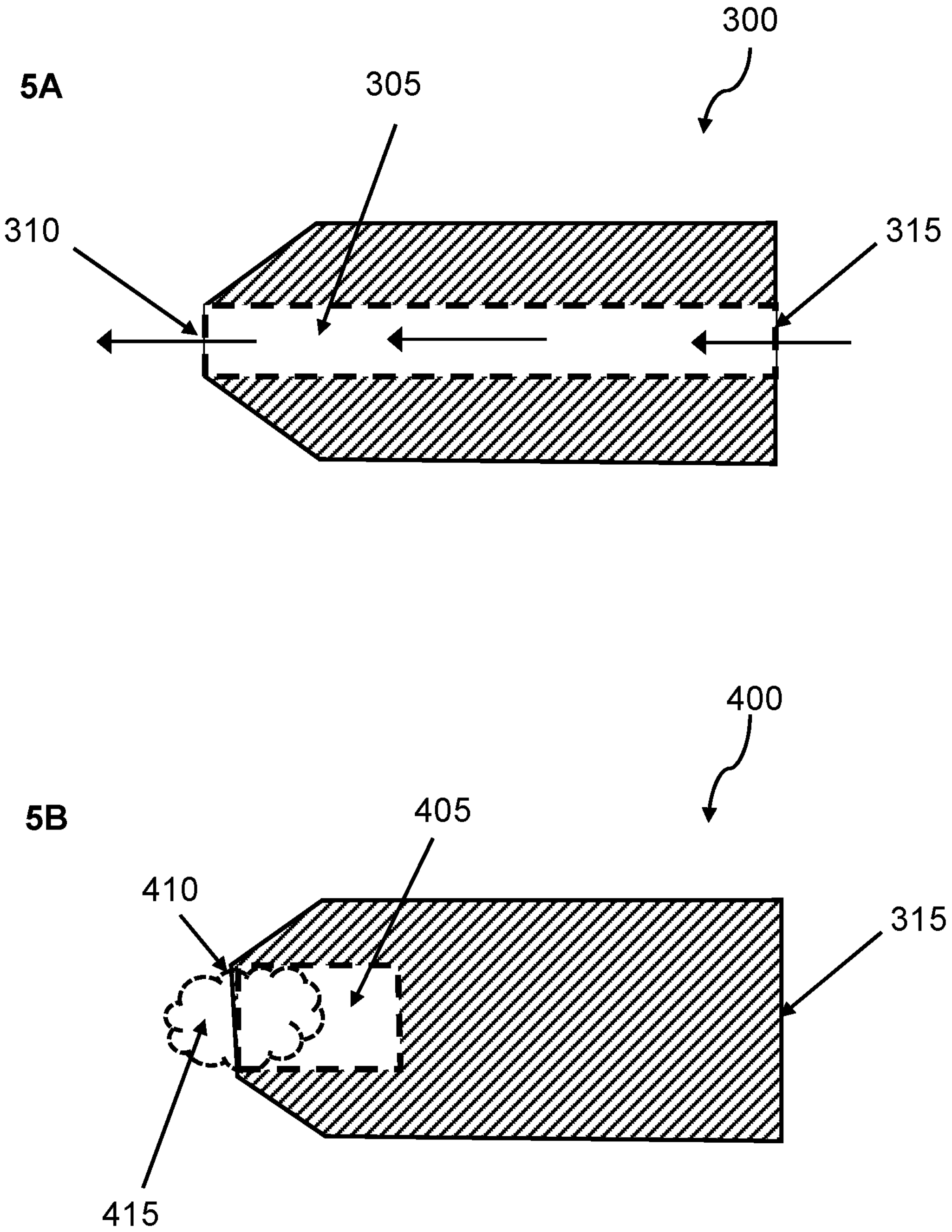

In an implementation of the described system, a sample is introduced to the plasma 255 via the electrode 240, which is comprised within the delivery system. FIGS. 5A and 5B show two configurations of an electrode 240 for supplying the sample into a high-density plasma 255 formed between the distal ends of the arms 230, 235 of the split-ring resonator 200 and the electrode 240. The electrodes 300, 400 described with respect to FIGS. 5A and 5B could be used in place of the electrode 240 described above with respect to any of FIG. 2A to 4, or in place of the electrode in either of the systems of FIGS. 6A to 8B, described below.

FIG. 5A illustrates an electrode 300 for supply of a fluid sample (being a liquid or gas sample). The electrode of FIG. 5A could equally be used for supply of a sample as an aerosol. In the example of FIG. 5A, the electrode 300 is metallic, with a hollow, open-ended cavity 305 extending therethrough. The cavity 305 is formed as a bore extending through the longitudinal direction of the electrode 300. Here, the first end of the electrode 300 is sharpened to a tip 310, wherein the bore extends to an aperture at the tip 310 (although an electrode having thin walls of the bore could also be used, which therefore may not require a sharpened tip). The tip 310 will be placed closest to the discharge gap within the system described above with reference to FIGS. 2A and 2B. A second aperture is arranged at the opposite end 315 of the electrode, which can be connected to a sample supply system (not shown).

The electrode 300 shown in FIG. 5A allows a fluid (or aerosol) sample to be passed through the electrode and directly into a plasma (specifically, a high-density mode plasma 255) generated between the discharge gap and the electrode 300. Beneficially, use of this mechanism for supplying the sample provides a high level of control for the amount of the sample added to a plasma, as well as the timing for doing so. For instance, a measured amount of sample may be added to the plasma, where in some implementations the measured amount of sample is added only after a stable high-density plasma 255 has been established. A further advantage is provided by the temperature gradient that is experienced along the length of the electrode, wherein the temperature at the electrode increases between the second end 315 of the electrode where the sample enters the cavity 305 and the electrode tip 310. As a result of this temperature gradient, sample analytes passed through the hollow cavity 305 are heated prior to entry to the plasma 255, reducing the likelihood of plasma quenching.

As will be understood, an electrode is an arrangement for conducting electric current when the system is in operation. In an alternative to the metallic electrodes discussed above with respect to FIGS. 5A and 5B, the arrangement may comprise a conduit for a conductive fluid (liquid or gas). The conduit may be a tube of a non-conducting material, such as alumina or quartz, having a structure the same or similar to the metallic electrode shown in FIG. 5A. In use, the conduit or tube carries a liquid (such as an acidic liquid) which is conductive (and connected to ground). As such, the combination of the tube of a non-conducting material and the conducting liquid convey and conduct electrical current and act as an electrode. Said electrode may be comprised within the delivery system, having the sample delivered to the plasma within or as part of the conductive fluid.

FIG. 5B illustrates an electrode 400 for supply of a solid sample. The electrode 400 is metallic, having a closed-ended cavity or closed-ended bore 405 extending through a portion of the electrode 400 closest to its tip 410. The closed-ended cavity 405 is formed as a cup-like hollow, into which the solid sample 415 can be placed. For instance, a solid sample 415 may be cut to a size and shape so that it is held in the cavity 405 through friction alone.

In use, the tip 410 of the electrode 400 comprising the cavity 405 (and holding a sample 415 therein) can be arranged closest to the discharge gap of the split ring resonator. A plasma 250 can be ignited at the discharge gap, as described above, until a high density plasma 255 is generated and drawn between the discharge gap and the electrode 400. Once the high-density plasma 255 has formed in this way, the solid sample 415 at the tip 410 of the electrode 400 will be held in the plasma 255. As such, the solid sample 415 is supplied directly to the plasma 255 for ionisation.

Figures 6A, 6B:
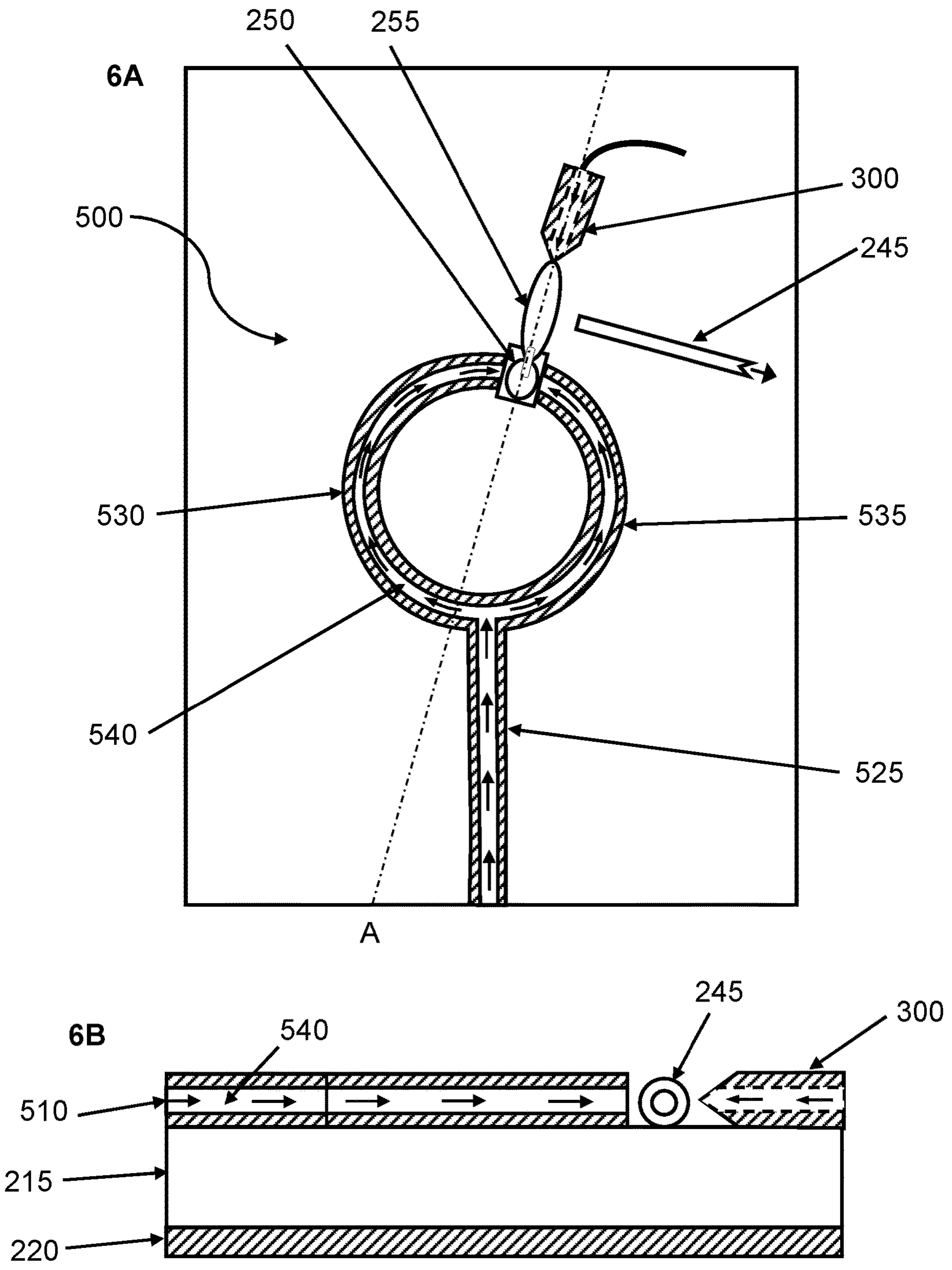

FIGS. 6A and 6B show a still further example configuration for the system shown in FIGS. 2A and 2B. Common to FIGS. 2A and 2B, the example configuration of FIGS. 6A and 6B includes a split ring resonator 500, an electrode 300, and optical elements 245. The electrode 300 has the configuration described above in relation to FIG. 5A, having a hollow cavity therethrough for supply of a fluid or aerosol sample, although a solid electrode 240 or the electrode 400 of FIG. 5B could also be used. The optical elements 245 may be optics or ions optics, arranged according to either the configuration of FIG. 3 or FIG. 4, respectively.

In contrast to FIGS. 2A and 2B, the example configuration of FIGS. 6A and 6B shows a split ring resonator 500 having a hollow channel 540 therethrough. The hollow channel can be used to carry or pass gas (such as a carrier gas) through the stem 525 and each arm 530, 535 of the split-ring resonator, as shown by the arrows in FIGS. 6A and 6B. Beneficially, supply of gas in this way allows for flushing of the discharge gap. This prevents build-up or crystallisation of analytes or contaminants in the discharge gap, which can reduce the stability of a generated plasma. Consequently, said hollow structure for the split ring resonator 500 can improve the lifespan of the described plasma source, and can reduce the need for rigorous cleaning of the device. Moreover, it can allow a ‘clean’ gas to be supplied to the discharge gap where ignition of the plasma first occurs, thus providing a more reliable ignition and then a stable plasma. In some cases, a different gas (such as air) could be used for flushing the hollow structure, before a carrier gas (in which a plasma is ignited, such as argon) is supplied to the discharge gap. For instance, this may reduce the volume of more expensive inert gas required for use within the system. In a still further example, a first gas could be supplied to the discharge gap for ignition of the plasma, and then a second, different gas could be supplied to the plasma to sustain the plasma once established.

FIG. 6B shows the split ring resonator 500 having the hollow channel 540 therethrough formed as a microstrip 510 on a dielectric substrate 215. As before, the substrate 215 comprises a metallic layer 220 on its back surface, opposite the surface on which the microstrip 510 is arranged. The metallic layer 220 may act as a ground plane.

Figure 7:
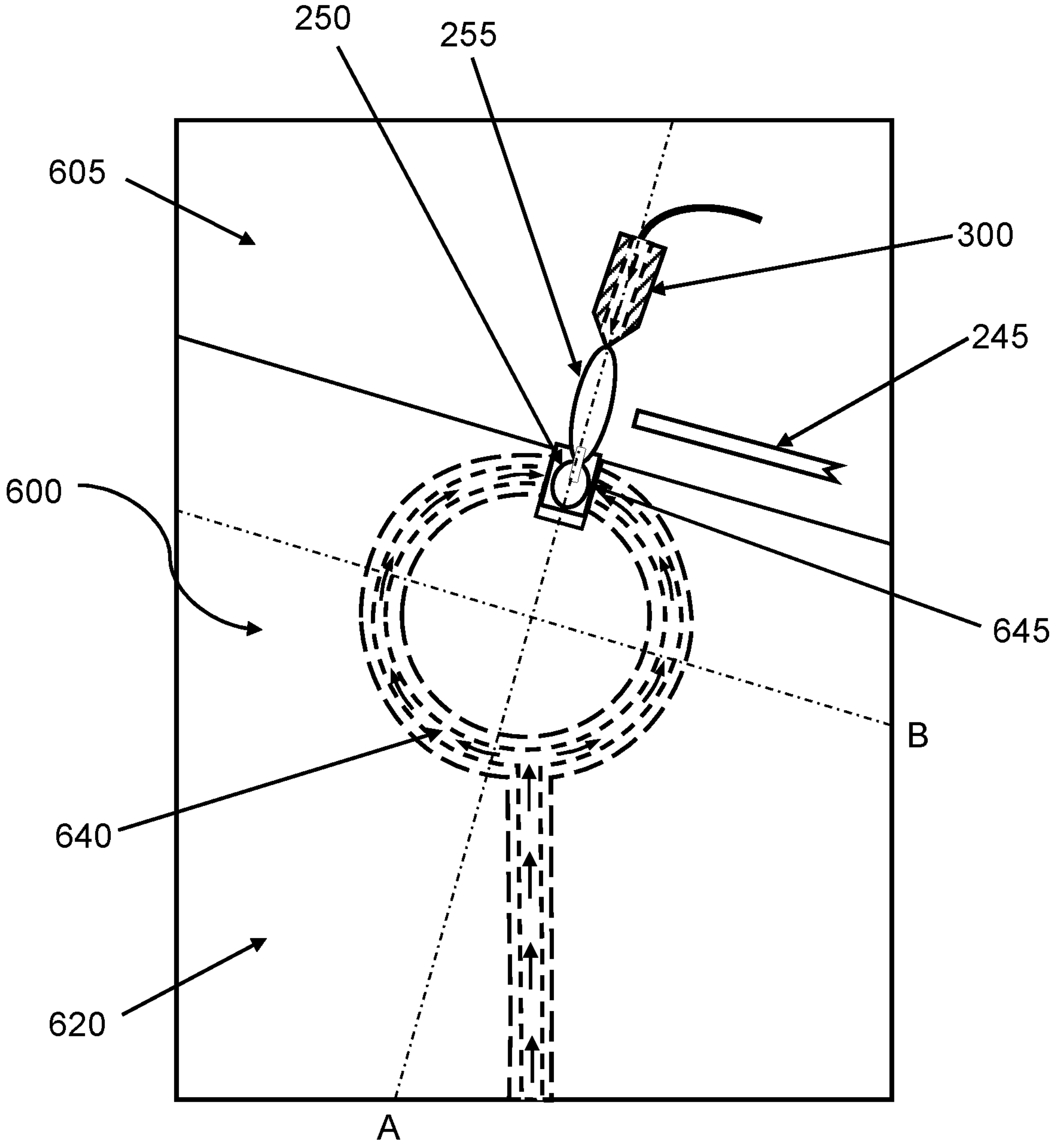
FIG. 7 illustrates an overhead view of the system for spectrometry of a sample in a plasma, the spit-ring resonator formed as a stripline configuration.
Figure 8A:
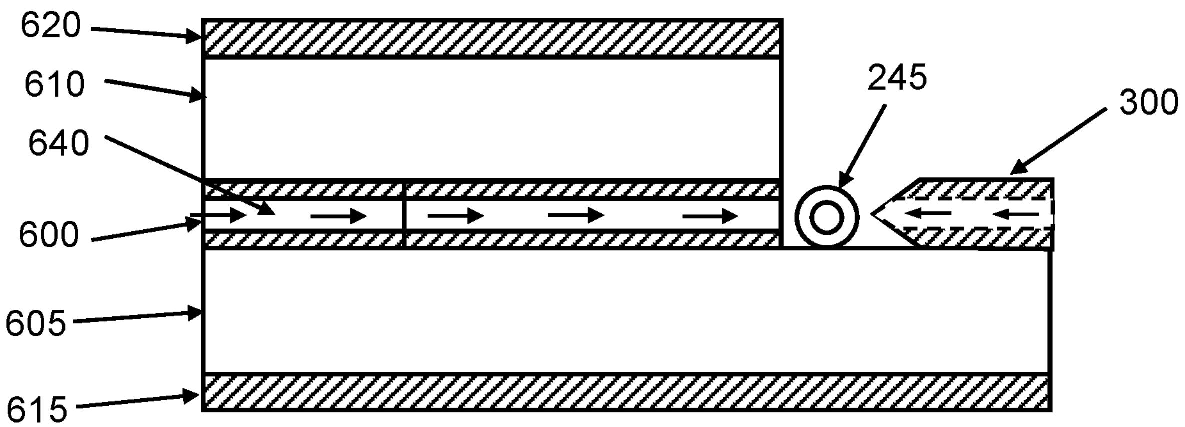
Figure 8B:
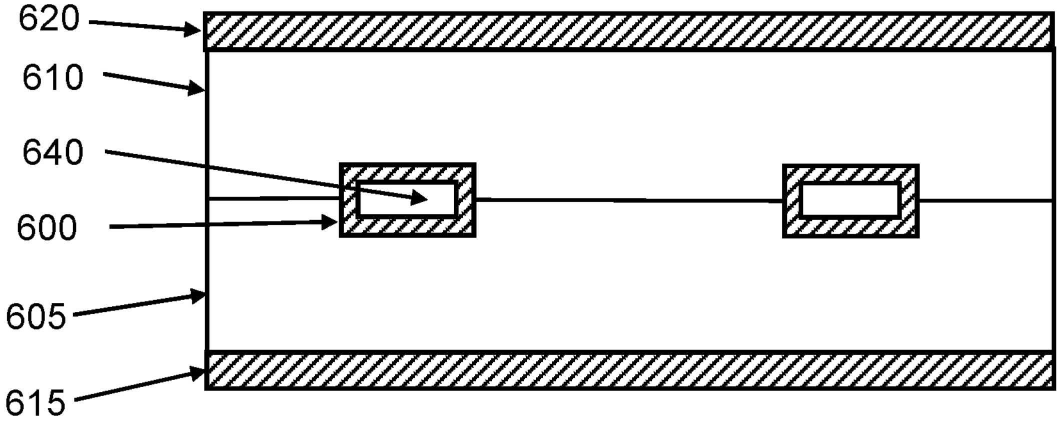

FIG. 7, together with FIGS. 8A and 8B, illustrate a still further configuration of the example system. Here, the system once again comprises a split-ring resonator 600 with a hollow channel 640 therethrough, an electrode 300 having a hollow cavity (which could instead be a solid electrode 240 or the electrode 400 of FIG. 5B), and optics 245 (which could be used according to either the configuration of FIG. 3 or FIG. 4). However, in this case the split ring resonator 600 is formed as a stripline.

FIG. 7 shows a plan view of the system, whilst FIG. 8A shows a cross-sectional view of the system on the axis ‘A’ marked as a dotted line in FIG. 7, and FIG. 8B shows a cross-sectional view of the system on the axis ‘B’ marked as a dotted line in FIG. 7. In this case, the split ring resonator 600 (having a hollow channel 640 therethrough) is sandwiched between a first 605 and a second 610 dielectric substrate. Each of the first 605 and second 610 dielectric substrate comprises a metallic layer 615, 620 on the outer surface (in other words, the opposite surface to that which the split ring resonator 600 is arranged). Each metallic layer 615, 620 acts as a separate ground plane. A cut-out 645 of the second dielectric substrate 610 and associated metallic layer 620 is arranged at the position of the discharge gap, allowing the plasma 250, 255 to be formed without hindrance from the second dielectric layer 610.

Formation of the split ring resonator 600 having a hollow channel 640 may be more straightforwardly formed in a stripline configuration as compared to a microstrip configuration. For instance, etching or cutting of one or both of the dielectric substrates 605, 610 can be used to form the channel in which the split ring resonator 600 can be arranged, with metallisation at the walls of the channel and sandwiching together the first 605 and second 610 dielectric substrate, to form the stripline having a hollow channel 640. Moreover, a split ring resonator 600 having a hollow channel 640 that is formed in this way may be more robust, and less likely to succumb to damage, as it is encased between the first 605 and second 610 dielectric substrates.

In the configuration of FIGS. 6A and 6B (where a hollow split ring resonator 500 is formed as a microstrip), and in the configuration of FIGS. 7, 8A and 8B (in which a hollow split ring resonator 600 is formed as a strip line), the size of the channel 540, 640 will be sufficient to allow a consistent and relatively smooth flow of gas (such as a carrier gas). In some implementations, the diameter for the channel 540, 640 through the split ring resonator is 2 to 1000 μm, although in some implementations the diameter of the channel 540, 640 is 10 to 1000 μm. For example, dimensions of the channel, if it had a circular cross-section, would be defined by the diameter as recited here, where for other configurations such as square or rectangular cross sections, the cross-section area would be for the same ranges. The gas may be pressurised at the entrance to the split ring resonator 500, 600, although in some implementations atmospheric pressure is used at the discharge gap at the position where a plasma 250 is ignited.

Optionally, a fluid or aerosol sample could be introduced to a carrier gas flowing through the hollow channel 540, 640 of the split ring resonator 500, 600 in FIGS. 6A to 8B. This allows delivery of the sample directly to the discharge gap and the plasma 250 thereat. In this configuration, the electrode may be a solid electrode, such as a metallic wire as shown in FIGS. 2A and 2B.

Figures 9A, 9B, 9C, 9D, 9E, 9F:
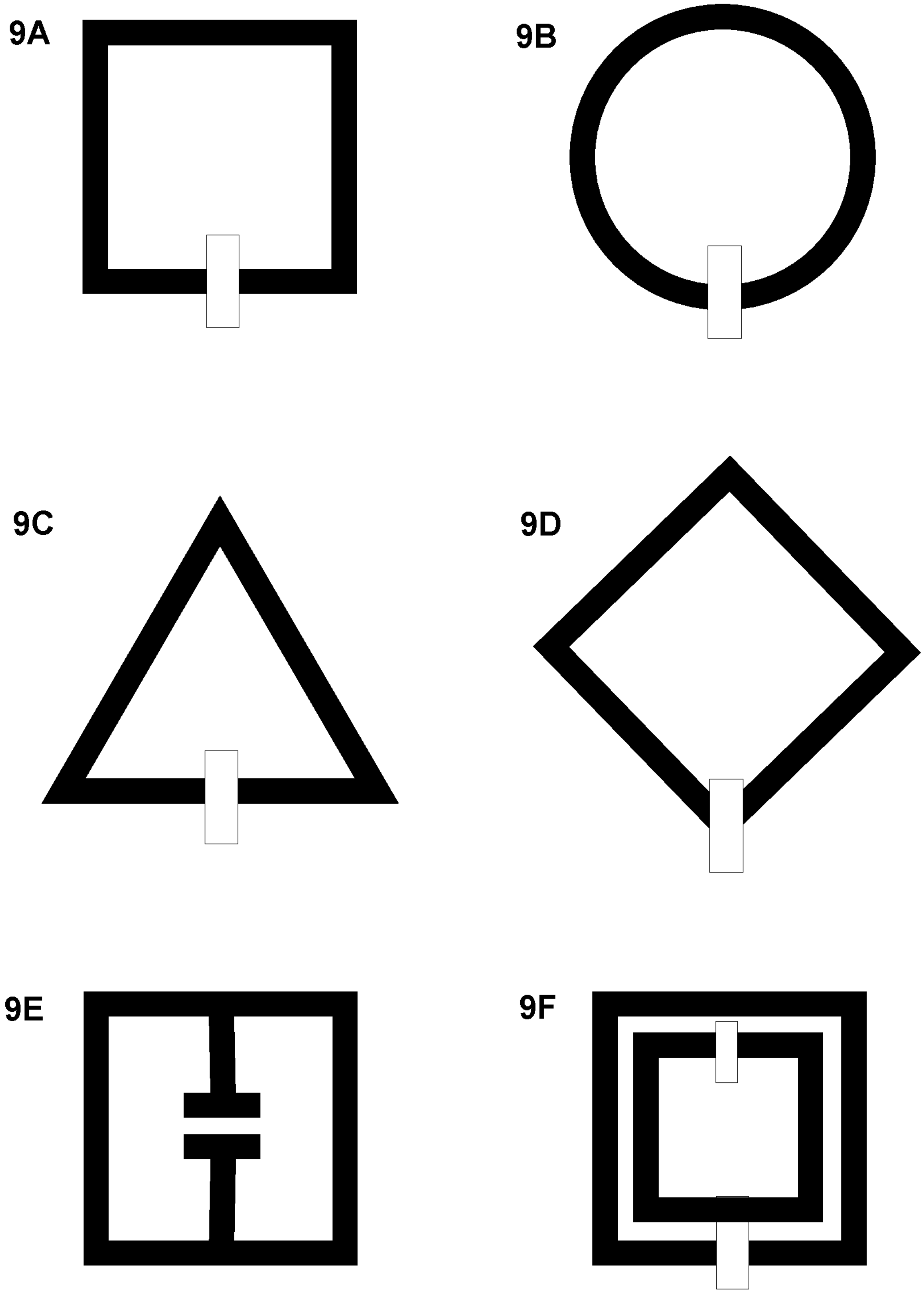
FIGS. 9A, 9B, 9C, 9D, 9E and 9F illustrate various configurations for a split-ring resonator.

In general, the split ring resonator is a microwave or radio wave resonator, having a split or gap between different portions of arms or legs of the structure. A large number of configurations for a split-ring resonator are contemplated. FIG. 9 shows various possible configurations for a split ring resonator, although the skilled person will understand that other configurations could be envisaged. In particular, the ring of the split ring resonator does not need to be formed as a circular ring. Instead, the ring or loop can be formed having almost any shape that generates a dipolar field as described above. The split-ring resonator may comprise a single loop (such as the square, circular, triangular and diamond shaped loops in FIGS. 9A, 9B, 9C and 9D, respectively). Alternatively, the split ring resonator may comprise a pair of enclosed loops (as shown in FIG. 9E), or a pair of concentric loops (as shown in FIG. 9F). Any of these configurations would be suitable as the split-ring resonator in the system for spectrometry of a sample in a plasma, as described elsewhere in this disclosure. The system described above is not intended to be limited to the split ring resonator shape and configuration depicted in FIGS. 2A to 4, 6A, 6B and 7.

A number of combinations of the various described embodiments could be envisaged by the skilled person. All of the features disclosed herein may be combined in any combination, except combinations where at least some of such features and/or steps are mutually exclusive. In particular, the described features of the various implementations are applicable to all implementations, where the features and/or steps are not mutually exclusive, and may be used in any combination. Likewise, features described in non-essential combinations may be used separately (not in combination).

In a general sense, the present disclosure describes a system for spectrometry of a sample in a plasma. The sample may be plasmized (in other words, the sample itself forms part of the plasma), so that the sample is introduced or injected into the plasma, and then excited and/or ionised. The system comprises: a split ring resonator, having a discharge gap; an electrode arranged in proximity to, but spaced apart from, the discharge gap such that, when a sufficient power is supplied to a plasma generated in the discharge gap, the plasma extends towards and couples with the electrode, so that the plasma is established in a region between the discharge gap and the electrode; and a delivery system, for introduction of a sample into the plasma established in the region between the discharge gap and the electrode; wherein the system is configured to direct an output from the plasma to a spectrometer for analysis. The electrode may be connected to ground.

The split ring resonator may have any configuration for a split ring resonator or complementary split ring resonator, including a configuration with a single metal ring or loop having a gap or split, or as a pair of concentric metal rings (such as a pair of enclosed loops with splits in them at opposite ends). The rings may be circular, square, triangular, hexagonal or have any other shape. The rings may have arms (or legs) forming a loop with a small gap (discharge gap) relative to another arm (or leg) of the split ring resonator. It will be understood that the split ring resonator is a device through which a magnetic flux penetrating the metal ring or rings will induce rotating currents. This in turn produces flux to enhance or oppose the incident field (depending on the split ring resonator resonant properties). This field pattern is dipolar. The small discharge gap produces large capacitance values which lower the resonating frequency, generating resonant wavelengths that are large compared to the dimensions of the structure.

In some implementations, the plasma extending towards the electrode may comprise the plasma transforming to a high density mode and reforming or igniting in a region at least between the electrode and the discharge gap (and in some cases also an area surrounding the region between the electrode and the discharge gap). The high-density mode describes the plasma having higher electron density than the plasma first ignited in the discharge gap. The power supplied to the plasma is associated with the amplitude of the excitation frequency applied to the split ring resonator.

In some cases, the delivery system comprises the electrode, the electrode being configured to introduce the sample into the plasma established in the region between the discharge gap and the electrode. The electrode may have a proximal end and a distal end, the proximal end arranged closer to the discharge gap, the proximal end comprising a sample holder. The sample holder may be a closed-end bore or closed-end cavity for receiving a solid sample. Alternatively, the electrode may have an open-ended bore or open-ended cavity therethrough, the bore arranged to conduct a fluid or aerosol sample to supply the sample into the plasma established in the region between the discharge gap and the electrode.

In a further alternative, the delivery system may comprise a conduit for passing the sample therethrough to supply the sample into the plasma established in the region between the discharge gap and the electrode. The conduit may be part of a pipette or other controlled, measured or pumped sample delivery apparatus.

The delivery system according to any of the alternatives described above may comprise other components, including a sample holder or sample reservoir. In some examples, the delivery system may comprise apparatus for phase transition of a sample (for instance from a solid to a liquid, or a liquid to a gas) and/or a pump for pressuring a fluid (liquid or gas) sample through the delivery system. The delivery system may comprise apparatus for formation of a sample as an aerosol.

The split ring resonator may comprise a hollow channel arranged therethrough, configured to supply a gas to the discharge gap. More particularly, the split ring resonator may be formed as a microstrip or as a stripline, wherein the split ring resonator may comprise a hollow channel arranged through a metallic strip of the microstrip or stripline so as to be configured to supply a gas to the discharge gap. Effectively, the metallic strip of the microstrip or stripline may comprise a tube with the hollow channel therethrough. In some implementations, the hollow channel may have a diameter of 2 to 1000 μm, and in some implementations the hollow channel may have a diameter of 10 to 1000 μm. The gas may be a carrier gas or gas for ignition and/or for sustaining of the plasma. The gas may be for purging the discharge gap prior to ignition of a plasma.

In a particular example, the split ring resonator may comprise a stem with a first and second arm extending therefrom, the first and second arm configured as a ring or loop with the discharge gap (or split) arranged between a distal end of each of the first and second arm, wherein the stem and the first and the second arm have a hollow channel arranged therethrough configured to supply a gas through the stem and through each of the first and second arm to the discharge gap. The distal end of each of the first and second arm is the end furthest from the stem. The first and second arm should be a different length or a different shape. This provides the portion of the arms at each side of the discharge gap to be out of phase when an excitation is applied. As noted above, the split ring resonator is not necessarily configured as a circular ring or loop, but can take a number of different forms.

The system may comprise the spectrometer, arranged to receive the output from the plasma. The output from the plasma is either electromagnetic radiation or ions (being ionic species, ionised atoms, or molecules).

In one example, the system is for optical emission spectrometry (OES) (or atomic emission spectrometry (AES)), and the spectrometer is an imaging spectrometer. In this case, the output from the plasma is electromagnetic radiation, and optical elements can be configured to receive the electromagnetic radiation output from the plasma and to direct the electromagnetic radiation to the imaging spectrometer. The imaging spectrometer may comprise an element for wavelength selection and a detector. The detector may be a photon detector (including but not limited to a CCD, a CMOS, or a photomultiplier).

In an alternative example, the system is for mass spectrometry (MS), and the spectrometer is a mass spectrometer. In this case, the output from the plasma is ions, and the optical elements comprise ion optical elements that may be arranged to receive the ions output from the plasma and to direct the ions to the mass spectrometer. The mass spectrometer may comprise a mass analyser and a detector, wherein the detector may be an ion detector (including but not limited to a Faraday cup, an electron multiplier, or a photomultiplier).

The system may comprise optics (optical elements) arranged to direct the output from the plasma to the spectrometer, although these are not essential. The optics may be optical elements for directing or focusing electromagnetic radiation (for instance, mirrors, lenses optical fibres), or may be ion optical elements or ion optics for directing or focusing ions (for instance, electrostatic lenses and mirrors), depending on the type of output from the plasma for analysis at the spectrometer. As an alternative, the spectrometer may be arranged to receive output directly from the plasma, without use of optics.

The carrier gas (or gas) may be any gas suitable for generating and sustaining the plasma. For example, the carrier gas may be argon, nitrogen, helium or air. The plasma may be formed in the carrier gas at atmospheric pressure or at lower pressures (for instance, 50 to 500 Pa).

In an example, the discharge gap is 0.01 to 2 mm, such as 0.01 to 1 mm. For instance, the discharge gap may be measured as the spacing between the distal end of the first arm and the distal end of the second arm of the split ring resonator.

The electrode may be spaced apart from the discharge gap by 0.2 to 20 mm, such as 0.5 to 10 mm. The distance to the electrode may be between 5 and 1000 times the discharge gap, such as between 10 and 100 times the discharge gap. The spacing may be a distance between a central point of the discharge gap and the closest portion of the electrode. The position of the electrode relative to the discharge gap may be adjustable. Various factors may influence the specific spacing of the electrode from the discharge gap, including but not limited to: 1) The background pressure of the discharge or plasma environment; 2) The species or composition of the discharge or plasma environment; 3) The net gas flow in the discharge or plasma environment (or liquid flow rate); 4) The temperature of the discharge or plasma environment; 5)

Geometrical factors such as the shape of the microstrip forming the split ring resonator and the sharpness of the electrode; 6) Layout and configuration factors of the system, including providing an exit path for the output of the plasma to the spectrometer; 7) The magnitude of any bias voltage established between the split ring resonator and the electrode; 8) The frequency of the split ring resonator excitation; 9) The amplitude—or power—of the excitation; and 10) The extent to which the impedance of the transmission line (and microstrip forming the split ring resonator) matches the impedance of the plasma established between the split ring resonator and the electrode.

In some implementations, the power supplied to the plasma generated in the discharge gap to cause the plasma to extend towards and couple with the electrode is provided by a power supplied to the split ring resonator that is greater than 5 Watt. In some implementations the power supplied to the split ring resonator is greater than 8 Watt. The power is sufficient to cause the plasma to extend towards and couples with the electrode so that the plasma is established in a region between the discharge gap and the electrode, but without arcing between the split ring resonator and the electrode.

The system may further comprise a power supply to apply energy to the split ring resonator. The energy may be supplied at a high frequency excitation, and may be a microwave frequency alternating voltage. The system may further comprise a controller to control the power supply.

The electrode is an arrangement for or means for conducting electric current when the system is in use. The arrangement may comprise a conductive metallic component or a conduit for a conductive fluid. For instance, the conductive metallic component may be a metal wire or tube. The conductive metallic component may be connected to ground, held at a potential relative to the split ring resonator. Alternatively, the arrangement may comprise a conduit for a conductive fluid. The conduit may be a tube of a non-conducting material, such as alumina or quartz, wherein in use the conduit carries a liquid (such as an acidic liquid) which is conductive. The liquid is connected to ground. As such, the combination of the tube of a non-conducting material and conducting liquid convey and conduct electrical current and act as an electrode.

There is also described herein a method for spectrometry of a sample in a plasma. The method comprises generating a plasma in the discharge gap of a split ring resonator; increasing the power supplied to the plasma to cause the plasma to extend towards and couple with an electrode arranged in proximity to, but spaced apart from, the discharge gap, so that the plasma is established in a region between the discharge gap and the electrode; introducing a sample into the plasma established in the region between the discharge gap and the electrode; and directing an output from the plasma to a spectrometer for analysis. The electrode may be connected to ground. The output from the plasma comprises an output from the sample.

The sample may be introduced into the plasma by a delivery system, and the delivery system may comprise the electrode. In one example, the electrode has a proximal end and a distal end, the proximal end comprising a sample holder, and the method further comprises inserting a solid sample into the sample holder at the proximal end of the electrode, and arranging the electrode in proximity to, but spaced apart from, the discharge gap of the split ring resonator, the proximal end arranged closer to the discharge gap than the distal end. The sample holder may be a closed-end bore or closed end cavity for receiving a solid sample. In another example, the electrode has an open-ended bore or open-ended cavity therethrough, and the method further comprises introducing the sample into the plasma by passing a fluid or aerosol sample through the open-ended bore or open-ended cavity arranged through the electrode. In another example, the sample is introduced into the plasma by a delivery system, and the delivery system comprises a conduit for passing the sample therethrough, and the method further comprises introducing the sample into the plasma by passing a fluid or aerosol sample through the conduit. The conduit may be a pipette.

The split ring resonator may comprise a hollow channel arranged therethrough, configured to supply a gas to the discharge gap. The split ring resonator may be formed as a microstrip or as a stripline, wherein the split ring resonator may comprise a hollow channel arranged through a metallic strip of the microstrip or stripline, the hollow channel configured to supply a gas to the discharge gap. The method may further comprise passing a gas through the hollow channel to supply the gas to the discharge gap. The split ring resonator may comprise a stem with a first and second arm extending therefrom, the first and second arm configured as a ring or loop with the discharge gap (or split) arranged between a distal end of each of the first and second arm, wherein the stem and the first and the second arm have a hollow channel arranged therethrough. The method may further comprise passing a gas through the hollow channel to supply the gas through the stem and through each of the first and the second arm to the discharge gap. The gas may be a carrier gas or gas for ignition and/or for sustaining of the plasma. The gas may be for purging the discharge gap prior to ignition of a plasma.

In one example, the method is for optical emission spectrometry (OES), and the spectrometer is an imaging spectrometer. In this example, the output from the plasma is electromagnetic radiation and directing an output from the plasma to a spectrometer for analysis comprises receiving the electromagnetic radiation output from the plasma at optical elements, and directing, via the optical elements, the electromagnetic radiation to the imaging spectrometer.

In another example, the method is for mass spectrometry (MS), and the spectrometer is a mass spectrometer. In this example, the output from the plasma is ions and directing an output from the plasma to a spectrometer comprises receiving ions output from the plasma at ion optical elements, and directing, via the ion optical elements, the ions to a mass spectrometer.

The method may further comprise applying energy to the split ring resonator to generate the plasma in the discharge gap. The energy may be a high frequency (radio frequency or microwave frequency) excitation.

In a final example, there is described a plasma source, comprising:

a split ring resonator, having a discharge gap;

wherein the split ring resonator comprises a hollow channel arranged therethrough, configured to supply a gas to the discharge gap; and wherein, in use, the split ring resonator is configured to generate a plasma at the discharge gap. The plasma may be generated in the gas supplied to the discharge gap. In other words, the plasma source may be a split ring resonator, having a discharge gap and formed as a microstrip or stripline, wherein the split ring resonator may comprise a hollow channel arranged through a metallic strip of the microstrip or stripline, the hollow channel configured to supply a gas to the discharge gap, and wherein, in use, the split ring resonator is configured to generate a plasma at the discharge gap. In some examples, the split ring resonator may have a stem with a first arm and second arm extending therefrom, the first and second arm configured as a ring or loop with a discharge gap (or split) arranged between a distal end of each of the first and second arm; wherein the stem, the first arm and the second arm of the split ring resonator each have a hollow channel arranged therethrough, configured to supply a gas through the stem and through each of the first and second arm to the discharge gap. In either case, the plasma source may be the split ring resonator used within the system or method for spectrometry of a sample in a plasma, described above. The gas may be a carrier gas or gas for ignition and/or for sustaining of the plasma. The gas may be for purging the discharge gap prior to ignition of a plasma.

Each feature disclosed in this specification, unless stated otherwise, may be replaced by alternative features serving the same, equivalent or similar purpose. Thus, unless stated otherwise, each feature disclosed is one example only of a generic series of equivalent or similar features.

As used herein, including in the claims, unless the context indicates otherwise, singular forms of the terms herein are to be construed as including the plural form and, where the context allows, vice versa. For instance, unless the context indicates otherwise, a singular reference herein including in the claims, such as "a" or "an" means "one or more". Throughout the description and claims of this disclosure, the words "comprise", "including", "having" and "contain" and variations of the words, for example "comprising" and "comprises" or similar, mean that the described feature includes the additional features that follow, and are not intended to (and do not) exclude the presence of other components.

The use of any and all examples, or exemplary language ("for instance", "such as", "for example" and like language) provided herein, is intended merely to better illustrate the disclosure and does not indicate a limitation on the scope of the disclosure unless otherwise claimed. No language in the specification should be construed as indicating any non-claimed element as essential to the practice of the disclosure.

Any steps described in this specification may be performed in any order or simultaneously unless stated or the context requires otherwise. Moreover, where a step is described as being performed after a step, this does not preclude intervening steps being performed. Any of the features described may be combinable, except where the context or description of a set of given features precludes it.

A method of manufacturing and/or operating any of the systems disclosed herein is also provided. The method may comprise steps of providing each of the features disclosed and/or configuring or using the respective feature for its stated function.

The spirit and scope of the present disclosure is not limited to the above examples but is encompassed by the following claims. All publications and patent applications cited above are incorporated by reference in their entirety for all purposes to the same extent as if each individual publication or patent application were specifically and individually indicated to be so incorporated by reference.

The invention claimed is:

1. A system for spectrometry of a sample in a plasma, comprising:

a split ring resonator, having a discharge gap;

an electrode arranged in proximity to, but spaced apart from, the discharge gap such that, when a sufficient power is supplied to a plasma generated in the discharge gap, the plasma extends towards and couples with the electrode, so that the plasma is established in a region between the discharge gap and the electrode; and a delivery system, for introduction of a sample into the plasma established in the region between the discharge gap and the electrode;

wherein the system is configured to direct an output from the plasma to a spectrometer for analysis;

wherein the delivery system comprises the electrode, the electrode being configured to introduce the sample into the plasma established in the region between the discharge gap and the electrode.

2. The system of claim 1, wherein the electrode has a proximal end and a distal end, the proximal end arranged closer to the discharge gap, and the proximal end comprises a sample holder.

3. The system of claim 1, wherein the electrode has an open-ended bore therethrough, the bore for conducting a fluid or aerosol sample therethrough to supply the sample into the plasma established in the region between the discharge gap and the electrode.

4. The system of claim 1, wherein the split ring resonator comprises a hollow channel arranged therethrough, the hollow channel configured to supply a gas to the discharge gap.

5. The system of claim 1, further comprising the spectrometer, arranged to receive the output from the plasma.

6. The system of claim 1, wherein the output from the plasma is electromagnetic radiation or ions.

7. The system of claim 1, wherein the system is for optical emission spectrometry (OES), or the system is for mass spectrometry (MS).

8. The system of claim 1, further comprising optics arranged to direct the output from the plasma to the spectrometer.

9. The system of claim 1, wherein the electrode is spaced apart from the discharge gap by a distance of 0.2 to 20 mm.

10. The system of claim 1, wherein the power supplied to the plasma generated in the discharge gap to cause the plasma to extend towards and couple with the electrode is provided by a power supplied to the split ring resonator that is greater than 5 Watt.

11. The system of claim 1, further comprising a power supply to apply energy to the split ring resonator.

12. The system of claim 1, wherein the electrode is an arrangement for conducting electric current when the system is in use, the arrangement comprising a conductive metallic component or a conduit for a conductive fluid.

13. A method for spectrometry of a sample in a plasma, comprising:

generating a plasma in the discharge gap of a split ring resonator;

increasing the power supplied to the plasma to cause the plasma to extend towards and couple with an electrode arranged in proximity to, but spaced apart from, the discharge gap, so that the plasma is established in a region between the discharge gap and the electrode;

introducing a sample into the plasma established in the region between the discharge gap and the electrode, wherein the sample is introduced into the plasma by a delivery system, and the delivery system comprises the electrode, the electrode being configured to introduce the sample into the plasma established in the region between the discharge gap and the electrode; and directing an output from the plasma to a spectrometer for analysis.

14. The method of claim 13, wherein the electrode has a proximal end and a distal end, the proximal end comprising a sample holder, the method further comprising inserting a solid sample into the sample holder at the proximal end of the electrode, and arranging the electrode in proximity to, but spaced apart from, the discharge gap of the split ring resonator, the proximal end arranged closer to the discharge gap than the distal end.

15. The method of claim 13, wherein the electrode has an open-ended bore therethrough, and the method further comprises introducing the sample into the plasma by passing a fluid or aerosol sample through the open ended bore arranged through the electrode.

16. The method of claim 13, wherein the split ring resonator comprises a hollow channel arranged therethrough, the method further comprising passing a gas through the hollow channel to supply the gas to the discharge gap.

17. The method of claim 13, wherein the method is for optical emission spectrometry (OES), or the method is for mass spectrometry (MS).

* * * * *